United States Patent Office 3,751,554
Patented Aug. 7, 1973

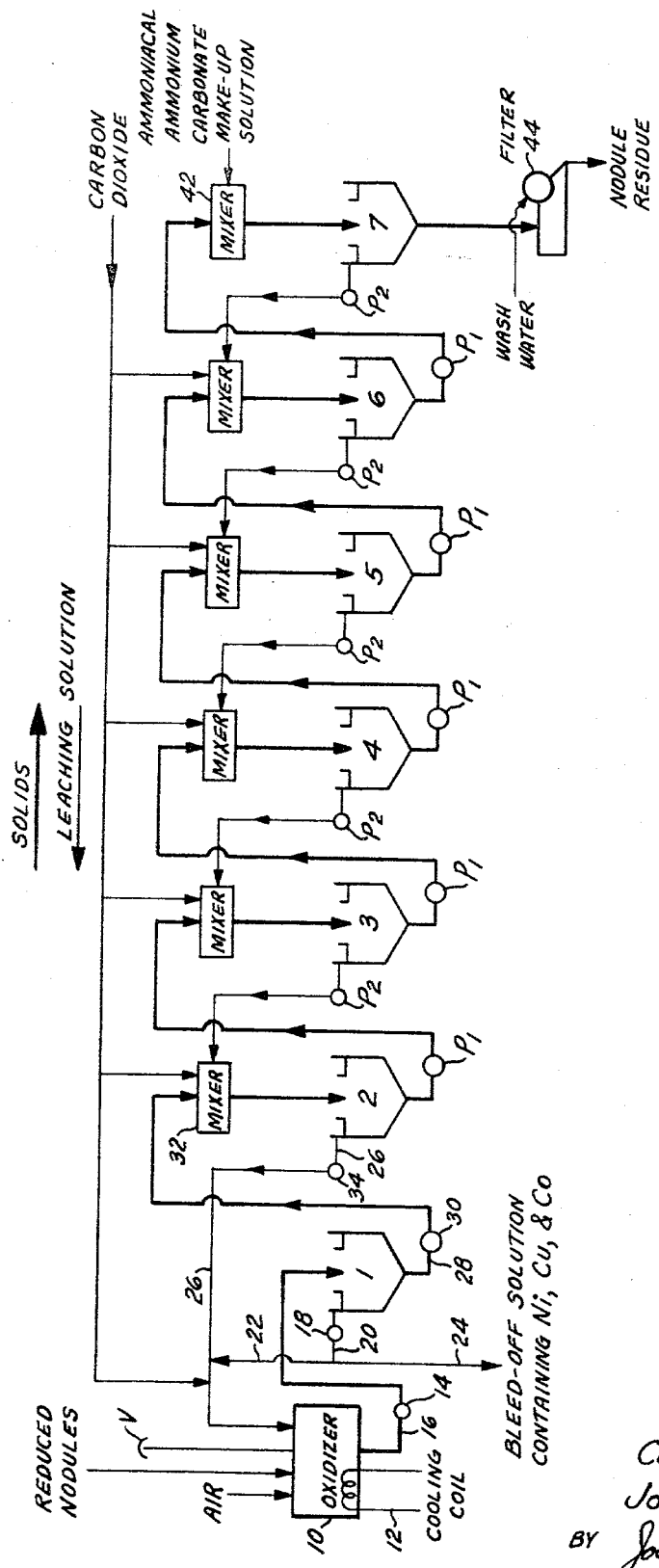

3,751,554
PROCESS FOR THE EXTRACTION OF NICKEL, COPPER AND COBALT FROM MANGANIFEROUS ORES
Conrad B. Bare, Coopersburg, and Joseph W. Pasquali, Bethlehem, Pa., assignors to Bethlehem Steel Corporation
Filed Aug. 19, 1971, Ser. No. 173,210
Int. Cl. C22b 3/00
U.S. Cl. 423—32         8 Claims

ABSTRACT OF THE DISCLOSURE

A process for the extraction of nickel, copper and cobalt from manganiferous ores, such as deep sea nodules, in which the ore is roasted from about 700° F. to about 1400° F. in a reducing atmosphere. The ore is cooled under non-oxidizing conditions, and leached under oxidizing conditions with an ammoniacal-ammonium carbonate solution comprising about 55 to 160 grams per liter of ammonia and about 30 to 120 grams per liter of carbon dioxide.

BACKGROUND OF THE INVENTION

This invention relates to a hydrometallurgical process for the extraction of nickel, copper and cobalt from manganiferous ores, and particularly to such extraction from deep sea nodules.

Among the benefits of oceanography has been the discovery of vast mineral deposits on the ocean floors. These mineral deposits, often in the form of deep set nodules, contain up to about 30% manganese and 15% iron. A typical sample analysis in weight percent is about:

|    | Percent |
|----|---------|
| Fe | 10.4    |
| Mn | 25.6    |
| Ni | 1.2     |
| Cu | 0.71    |
| Co | 0.13    |

Nodules, because of their large manganese content, are often referred to as manganiferous ores. It is not, however, the manganese in the ore which is of particular interest, but the less abundant, but more valuable nickel, copper, and cobalt. The nodules of one area, representing 1.5% of the total Pacific Ocean area, are estimated to contain three times the nickel present in the world's total known land based ores.

Hydrometallurgical processes for extracting nickel and cobalt from ores in which they are present as oxides are known. However, these processes were developed especially for laterites, which contain very little manganese (less than 1%) and virtually no copper (less than about 0.1%). These processes have not proved applicable for ores such as deep sea nodules which contain large amounts of manganese and economically attractive amounts of copper.

The extraction of mineral values from deep sea nodules is also known. Ammonium sulfate has been used to leach iron and manganese from reduced deep sea nodules. Another prior art process discloses preferentially leaching nickel and manganese while leaving cobalt in the iron rich tails.

None of these prior art processes provide an economic, simple method for extracting nickel, copper, and cobalt from a manganiferous ore without the concomitant extraction of undesirable amounts of manganese and/or iron.

SUMMARY OF THE INVENTION

We have discovered a hydrometallurgical process for the selective extraction of nickel, copper, and cobalt from manganiferous ores which overcomes aforementioned prior art deficiencies. Briefly, the steps of the process of this invention include (1) roasting the ore at a temperature above 700° F. in a reducing atmosphere such as, for example, carbon dioxide and carbon monoxide, to reduce only nickel, copper, and cobalt to a metallic state; (2) cooling the reduced ore under non-oxidizing conditions, followed by (3) leaching the reduced ore in the presence of air, or oxygen, with an ammoniacal-ammonium carbonate solution containing about 55 to 160 grams per liter of ammonia and 30 to 120 grams per liter of carbon dioxide. Nickel, copper, and cobalt are thus selectively solubilized and extracted with a minimum concomitant extraction of manganese and iron.

BRIEF DESCRIPTION OF THE DRAWING

The figure is a flow diagram of an embodiment of this invention.

DESCRIPTION OF THE PREFERRED EMBODIMENTS

The following specific embodiments of the method of this invention are directed to batch extraction, in Example 1, and continuous, countercurrent extraction, in Example 2.

In Example 1, a 100 gram sample of deep sea nodules with an approximate chemical analysis of:

|    | Percent |
|----|---------|
| Fe | 10.4    |
| Mn | 25.6    |
| Ni | 1.17    |
| Cu | 0.71    |
| Co | 0.13    | was dried and ground to pass a 65 mesh screen. The ground ore was roasted at about 1000° F. for 90 minutes in an atmosphere of carbon dioxide ($CO_2$) and carbon monoxide (CO) in a ratio of about 2:1 by volume. After roasting, the ore was cooled to ambient temperature in an atmosphere of the same gases. The cooled ore sample was then mixed with one liter of an aqueous ammoniacal-ammonium carbonate solution made by dissolving ammonium bicarbonate ($NH_4HCO_3$) and ammonium hydroxide ($NH_4OH$) in water to give the equivalent of about 110 grams of ammonia and about 80 grams of carbon dioxide per liter of solution. The slurry of ore and leaching solution was placed in a two-liter closed vessel fitted with a hollow shaft mechanical stirrer and a manometer. Agitation of the slurry was begun and oxygen was introduced into the slurry through the hollow stirring shaft. Agitation and aeration were maintained for a period of two hours during which time consumed oxygen was replaced so that ambient pressure was maintained in the vessel. At the end of the leaching period, the agitation and aeration were stopped and the solids were allowed to settle. The supernatant liquor was siphoned off and replaced with sufficient fresh leaching solution (about 110 g. ammonia and 80 g. carbon dioxide per liter of solution) to again make one liter of slurry. Stirring and aeration were resumed for a second two-hour leach period. At the end of the second leach period, settling and siphoning were carried out as before on the sample. Fresh leach solution of the same composition as used previously was again added and the above procedure repeated for a third and final leach. Analysis in weight percent showed 96% of the nickel, 96% of the copper, and 71% of the cobalt were extracted from the ore. In Example 1, only 3% of the manganese and less than 1% of the iron were coextracted.

Example 2, indicated in the figure, is an example of a continuous countercurrent decantation (the solids and leaching solution move counter to each other), abbreviated CCD hereinafter. CCD is desirable industrial applications in order to serve expensive leach solution and to obtain maximum concentrations of the desired metals in the leach solution.

Referring to the figure, ground reduced nodules, prepared as described in Example 1, enter oxidizer 10 where they are slurried with agitation in an ammoniacal-ammonium carbonate solution to be described more fully hereinafter. Air is used in oxidizer 10 as the oxidizing medium and means are provided in oxidizer 10 to introduce the air into the agitating slurry. Venting means V to allow the escape of excess gas is also provided. The slurry in oxidizer 10 is kept at below about 45° C. by cooling coil 12. Following aeration and agitation, the slurry is pumped by pump 14 through line 16 to thickener 1. The area of thickener 1 is such that a clear overflow is produced. Solids from the slurry settle to the bottom of thickener 1 while solution overflow is removed by pump 18 through line 20. The solution from thickener 1 is now "pregnant" with desirable metal values and is split two ways with one portion being bled-off through line 24 for metal recovery. The second portion of the pregnant solution is returned to oxidizer 10 by line 22 and line 26 where it forms a portion of the solution flowing into oxidizer 10. Solids leave thickener 1 in line 28 and are pumped by pump 30 to mixer 32 where they are reagitated with an ammoniacal-ammonium carbonate solution to again form a slurry. The slurry formed in mixer 32 flows to thickener 2 where the solids settle to the bottom and excess solution overflows and is pumped to oxidizer 10 in line 26 by pump 34. Carbon dioxide is added to the solution, as required, in mixer 32 to maintain solution $CO_2$ strength at about 80 g./liter. In like manner, the solids are continually pumped by pumps, P1, to succeeding mixers wehere they are slurried with leach solutions, allowed to settle and again pumped, re-slurried, allowed to settle, etc. until the final thickener, which in the figure is thickener 7. Following settling in thickener 7, the solids are filtered and washed with water in filter 44 and discarded.

Fresh ammoniacal-ammonium carbonate leaching solution enters the CCD system in mixer 42 where it meets solids entering mixer 42 from thickener 6. The composition of the leach solution is about 110 grams ammonia and 80 grams carbon dioxide per liter of solution. Each of the six mixers shown in the figure receives leach solution from the overflow from a succeeding thickener by the aid of pumps P2. Before mixing occurs in any given mixer, the leach solution is analyzed and depleted carbon dioxide is replaced.

Of primary importance, we have discovered that, during leaching, reduced deep sea nodules have a significant potential to consume carbon dioxide from the leach solution, forming manganese carbonate ($MnCO_3$). This consumption is an unexpected phenomenon, and in CCD extractions where it is economically expedient to maintain a small solution to solids ratio, the carbonate ion concentration is thus easily depleted. As a result, the leach solution becomes less efficient as a solvent for nickel, copper, and cobalt.

In a laboratory scale simulated CCD extraction the average analysis of carbon dioxide present in the leach solution after the solution passed through seven stages of decantation was only 42 grams per liter solution (4%) compared to 110 grams per liter (11%) originally present in the fresh solution. Analysis showed that 90% of the nickel, 87% of the copper and 30% of the cobalt originally present was extracted. Thus, in the figure, fresh leach solution entering the CCD system must either contain more than the optimum amount of carbon dioxide, or carbon dioxide must be replenished to maintain optimum carbon dioxide concentration during extraction.

In the method of this invention, it is not necessary that the carbon dioxide replenishment be accomplished by any special means, or any specific number of times, or at any special place in the operation. Although the figure shows carbon dioxide addition at each mixing stage, this is only illustrative of one possible mode of operation.

The influence of the carbon dioxide concentration on the effectiveness of the leach solution as a solvent is not the same for nickel, copper, and cobalt. We have found that, for nodules reduced at 1400° F., nickel extraction is essentially at a maximum when carbon dioxide concentrations range from about 20 grams per liter (2%) to as high as 120 grams (12%) per liter. Copper extraction, on the other hand, does not reach a maximum until the carbon dioxide concentration is at least about 40 grams per liter (4%), and then decreases markedly at concentrations above about 80 grams per liter (8%). Cobalt extraction steadily improves as the carbon dioxide concentration increases from 10 grams per liter (1%) to 120 grams per liter (12%).

Another discovery relates to the effective range of ammonia concentration in the leach liquor for our process. We have found that, while it is essential to have sufficient ammonia available to form ammine complexes of the nickel, copper, and cobalt, too much ammonia will result in increased manganese extraction. The ammonia concentration may be between about 55 to 160 grams per liter of solution (5.5–16%), but should be about 110 grams (11%) for optimum extraction of desired metals with minimum concomitant extraction of undesired manganese.

Grinding the nodules is important in that it promotes more intimate contact between the ore and the various reactants. However, it was found that grinding the ore to finer than about a —65 mesh did not further improve the extraction results.

Although aeration during leaching is an essential feature of our process, it is not necessary for the oxygen bearing gas to be of any particular grade of oxygen. Air is satisfactory and, by contrast, pure oxygen would also be satisfactory for this purpose.

Reduction of nickel, copper, and cobalt to the metallic state is an essential step of this process. Reduction may be accomplished in the range of about 700° F. to about 1500° F., but we have discovered that a temperature range of about 1000° F. to about 1400° F. is preferable. Reduction at the higher end of the temperature range is preferred because the high temperature decreases the tendency of the nodules to absorb carbon dioxide from the leach solution during leaching. As the temperature of reduction increases beyond 1400° F., however, extraction, especially of copper, is adversely affected.

The atmosphere of the reducing furnace is important. A ratio of carbon dioxide to carbon monoxide of about 2:1 is preferable. However, it is not essential that these two gases be used exclusively. Other gases or mixtures of gases, such as hydrogen and water vapor, for example, may be used. The only criterion necessary is a reduction potential strong enough to selectively reduce nickel, copper and cobalt to the metallic state with minimum reduction of other metal oxides.

After the ore has been reduced, it is essential to protect it from oxidation until after being contacted with the leaching solution. The benefits of cooling the ore at this point derive from the need to prevent loss of carbon dioxide and ammonia which would occur as a result of contact between the hot ore and the room temperature leach solution.

Further, cooling of the leach solution may be desirable to compensate for the heat of reaction of the leaching step.

It should be obvious to those skilled in the art that many other modifications are possible in our process without departing from the scope of our invention.

We claim:

1. A process for the extraction of nickel, copper, and cobalt from manganiferous ore comprising the steps of:
    (a) heating the ore at a temperature above about 700° F. in a reducing atmosphere for a time sufficient to reduce nickel, copper, and cobalt to the metallic state, but insufficient to reduce iron and manganese to the metallic state;
(b) cooling the ore under non-oxidizing conditions;
(c) forming a slurry with the reduced ore and an aqueous ammoniacal-ammonium carbonate solution containing ammonia in the range of about 55 to about 160 grams per liter of solution and carbon dioxide in the range of about 30 to about 120 grams per liter of solution;
(d) aerating the slurry to form a nickel, copper and cobalt bearing solution;
(e) maintaining by replenishment the concentration of ammonia and carbon dioxide in the ranges of step (c) throughout the aerating period; and
(f) separating the nickel, copper, and cobalt bearing solution from the ore.

2. The process as claimed in claim 1 in which the temperature of step (a) is between about 1000° F. and about 1400° F.

3. The process of claim 1 including the step of grinding the ore prior to heating the ore.

4. The process of claim 3 in which the grinding step is sufficient to reduce the ore size to —65 mesh.

5. The process of claim 1 in which the aqueous ammoniacal-ammonium carbonate solution contains about 110 grams of ammonia per liter of solution and about 80 grams of carbon dioxide per liter of solution.

6. A countercurrent decantation extraction of nickel, copper and cobalt from a manganiferous ore comprising the steps of:
(a) heating the ore at a temperature above about 700° F. in a reducing atmosphere for a time sufficient to reduce nickel, copper and cobalt to the metallic state, but insufficient to reduce iron and manganese to the metallic state;
(b) cooling the ore under non-oxidizing conditions;
(c) forming a slurry with the reduced ore and an aqueous ammoniacal-ammonium carbonate solution containing ammonia in the range of about 55 to about 160 grams per liter of solution and carbon dioxide in the range of about 30 to about 120 grams per liter of solution, a portion of the solution deriving from decantation of leach solution from leached ore in a first and a second thickener;
(d) aerating the slurry while maintaining said range of ammonia and carbon dioxide in the solution phase of the slurry;
(e) introducing the slurry into the first thickener to separate solution from the ore;
(f) reslurring the separated ore with an aqueous ammoniacal-ammonium carbonate solution containing ammonia in the range of about 55 to about 160 grams per liter of solution and carbon dioxide in the range of about 30 to about 120 grams per liter of solution;
(g) aerating the re-slurry while maintaining said range of ammonia and carbon dioxide in the solution phase of the slurry during the aeration; and
(h) introducing the slurry of step (f) into the second thickener to separate solution from the ore.

7. The process as claimed in claim 6 in which the aqueous ammoniacal-ammonium carbonate solution contains 110 grams of ammonia per liter of solution and about 80 grams of carbon dioxide per liter of solution.

8. In a hydrometallurgical process for the extraction of nickel, copper, and cobalt from a manganiferous ore including steps in which the ore is roasted in a reducing atmosphere to reduce nickel, copper and cobalt to metallic state but in which iron and manganese remain in a non-metallic state, and in which an ammoniacal-ammonium carbonate solution is utilized as a leaching agent for said nickel, copper and cobalt, the improvement comprising:
(a) establishing an initial pre-leaching ratio of ammonia content in the leaching solution within the range of about 55 to about 160 grams ammonia per liter of solution and a carbon dioxide content in the range of about 30 to about 120 grams per liter of solution;
(b) monitoring the ammonia and carbon dioxide content of said leach solution during the leaching process; and
(c) replenishing said ammonia and carbon dioxide as necessary throughout substantially the entire leaching period to maintain said ammonia and said carbon dioxide content at the pre-leaching solution ratio.

References Cited
UNITED STATES PATENTS

| | | | |
|---|---|---|---|
| Re. 24,369 | 8/1957 | Dougherty | 75—103 |
| 1,487,145 | 3/1924 | Earon | 75—103 X |
| 3,100,700 | 8/1963 | Hills | 75—103 X |
| 2,363,315 | 11/1945 | Grothe | 75—103 X |
| 3,644,114 | 2/1972 | Vosochlova et al. | 75—119 X |
| 3,471,285 | 10/1969 | Rolf | 75—103 |
| 2,400,115 | 5/1946 | Hills et al. | 75—103 X |
| 2,829,963 | 4/1958 | Hixson et al. | 75—103 |
| 2,400,098 | 5/1946 | Brogdon | 75—103 X |
| 1,440,186 | 12/1922 | Sulman et al. | 75—103 X |

HERBERT T. CARTER, Primary Examiner

U.S. Cl. X.R.

423—144, 150; 75—103, 117, 119

UNITED STATES PATENT OFFICE
CERTIFICATE OF CORRECTION

Patent No. 3,751,554           Dated August 7, 1973

Inventor(s) CONRAD B. BARE, ET AL

It is certified that error appears in the above-identified patent and that said Letters Patent are hereby corrected as shown below:

Column 3, line 2, "serve" should read --conserve--

Column 5, claim 6, subparagraph (b) "non-oxiding" should read --non-oxidizing--.

Signed and sealed this 6th day of August 1974.

(SEAL)
Attest:

McCOY M. GIBSON, JR.         C. MARSHALL DANN
Attesting Officer            Commissioner of Patents